July 17, 1951  G. W. CURTIS  2,560,557
END FACE OIL AND DIRT SEAL
Filed Aug. 5, 1947  2 Sheets-Sheet 1

INVENTOR.
George W. Curtis
BY
Morsell & Morsell
ATTORNEYS.

July 17, 1951 G. W. CURTIS 2,560,557
END FACE OIL AND DIRT SEAL
Filed Aug. 5, 1947 2 Sheets-Sheet 2

INVENTOR.
George W. Curtis
BY
Morsell & Morsell
ATTORNEYS.

Patented July 17, 1951

2,560,557

UNITED STATES PATENT OFFICE 2,560,557

END FACE OIL AND DIRT SEAL

George W. Curtis, Wauwatosa, Wis.

Application August 5, 1947, Serial No. 766,339

16 Claims. (Cl. 288—2)

This invention relates to improvements in end face oil and dirt seals.

Heretofore, plural part end face seals have been provided which include a circular sealing element and a separate spring for pressing the sealing element against a sealing surface. In addition, these devices usually embody a flexible diaphragm as a part of or cooperating with the sealing element, and there is need for a metal container to protect the spring and other parts from dirt, stones, grass or other material which might come in contact with the seal during use. Usually, the flexible diaphragm is integral with the sealing face of the sealing element and a problem has been presented of preventing the sealing element from losing its circular form at the line of contact, and this possibility is increased when the seal is exposed to dirt, stones, grass or other material.

When the seal is to be used on a rotating shaft or in conjunction with a rotating wheel, the seal must be stationary on one part, such as on the housing or wheel-supporting spindle, and have relative sliding motion with respect to the other part. Therefore, the fixing of the seal to its respective housing or spindle has been an important problem. This has usually been accomplished by keying or press fitting the metal container in position. The metal container therefore has heretofore been necessary to serve the above function, as well as to protect the seal from outside material as herefore mentioned.

It is a general object of the present invention to improve upon, simplify, and obviate the above-mentioned objections to prior seals by providing an end face seal of one piece construction.

A further object of the invention is to provide a seal as above described wherein the outside container may be eliminated and wherein the sealing element, while having a necessary axial flexibility nevertheless possesses radial stiffness and rigidity to maintain its exact circular form at the sealing face; has sufficient strength to prevent deformation such as that caused by stones, winding grass or other outside action; and has such strength and holding power that it may be directly press fitted in position either at its bore or at its outside periphery.

A further object of the invention is to provide a seal having two sealing faces, one of relatively small diameter and the other of relatively large diameter, wherein either or both of said faces may be utilized for rubbing contact depending upon requirements.

A further object of the invention is to provide a seal having a relatively wide range of axial flexibility with a minimum variation in end face pressures throughout said range.

A more specific object of the invention is to provide an end face seal which comprises a one piece circular molded member of flexible material, such as rubber or a synthetic substitute, which is reinforced in a novel manner by a yielding ring of spring metal.

Other objects of the invention are to provide an end face seal which is simple in construction, easy to assemble and disassemble, efficient in operation, durable, relatively inexpensive, and well adapted for the purposes described.

In the accompanying drawing illustrating the preferred embodiments of the invention, in which the same reference numerals designate the same parts in all of the views.

Figures 3, 7:
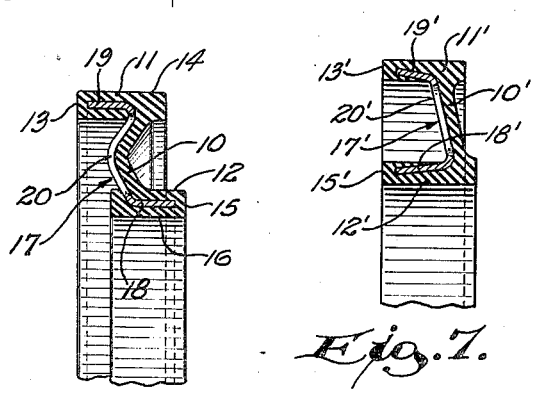
Fig. 3 is a fragmentary sectional view taken along the same line as Fig. 2 but showing how the seal may be axially collapsed under pressure.
Fig. 7 is a fragmentary sectional view of a seal taken along a line similar to Fig. 2 showing a modification wherein the flange of smaller diameter and the sealing face of said flange in the same direction as the flange of larger diameter and its sealing face.
Figure 9:
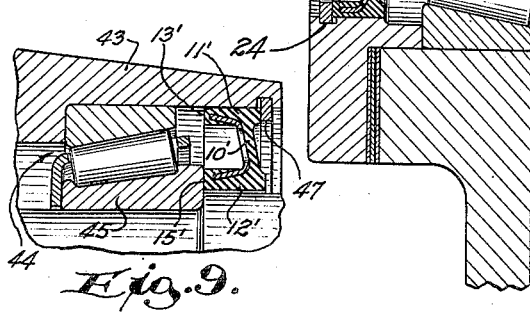

Fig. 8 is a fragmentary sectional view showing a seal of the type of Fig. 7 pressed onto a non-rotatable spindle and having its larger sealing face in rubbing contact with the rotating outer race of a roller bearing set; and, Fig. 9 is a fragmentary sectional view showing a seal of the type of Fig. 7 pressed into a housing and held axially therein by a removable ring, and having its smaller sealing surface in rubbing contact with the end face of the inner race of a roller bearing set.

Referring more particularly to the drawings, the seal includes an annular diaphragm portion 10 which is outwardly flared and which has a large annular flange 11 projecting from its outer periphery and a small annular flange 12 projecting from the bore of the seal. The portions 10, 11 and 12 are of integral molded construction and formed of flexible sealing material such as "Buna" rubber or "Hycar." Any suitable non-metallic incompressible wear-resisting material of this type is satisfactory.

The flange 11 forms a large sealing ring having an annular end sealing face 13 at right angles to a peripheral sealing face 14. The flange 12 forms a sealing ring of smaller diameter having an end sealing face 15 and a peripheral sealing face 16 at its bore.

Molded into the sealing device at the time of manufacture is a reinforcing ring 17 of suitable spring metal. It includes a ring-shaped flange 18 molded within the sealing ring 12 and a ring-shaped flange 19 molded within the sealing ring 11. There is also integral connecting means between the portions 18 and 19 reinforcing the diaphragm portion 10 of the sealing device. Preferably, this connecting means takes the form of spaced yielding fingers 20 which are positioned to yieldingly resist axial movement of the sealing rings toward each other. Thus, when the sealing device is installed between two restraining end surfaces, if it is installed in slightly axially compressed condition, the yielding fingers 20 will act to constantly urge the sealing rings back to the normal position of Fig. 2 and thus create good sealing pressures during use.

In the preferred embodiment of the invention, the yielding fingers back up the diaphragm portion 10. These fingers may, however, be completely embedded in the diaphragm, if desired. Fig. 3 illustrates the form of the seal when its sealing rings are forced axially toward one another to deform the diaphragm.

Due to the fact that the reinforcing member 17 has the ring-shaped flanges 18 and 19, it is apparent that the sealing rings 11 and 12 are reinforced so that they resist any action tending to deform said portions out of their circular shape.

Figure 5:
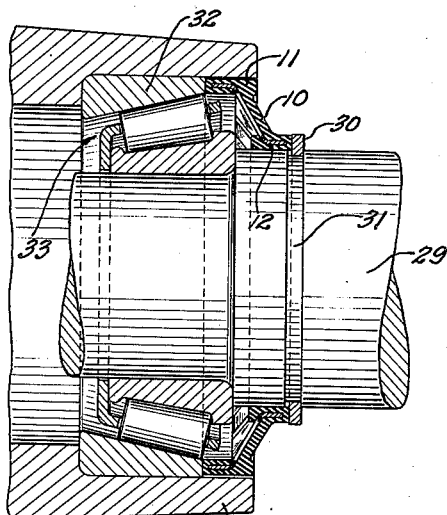
Fig. 5 is a fragmentary sectional view showing a seal pressed onto a non-rotatable spindle and having its large sealing face in rubbing contact with a rotating outer race of a roller bearing set.
Figure 6:
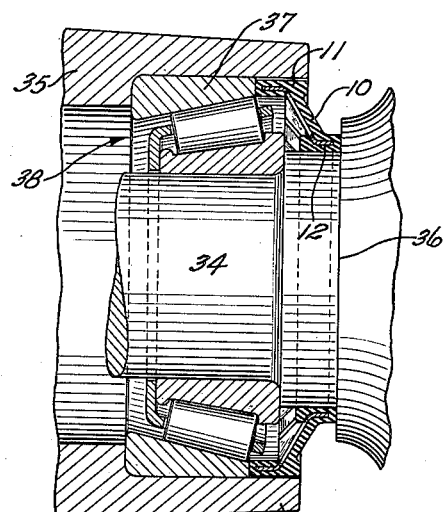
Fig. 6 is a fragmentary sectional view showing a seal so disposed that it is free to rotate independently between two opposed annular surfaces, one on the spindle and the other on the outer race of the roller bearing set.
Figure 4:
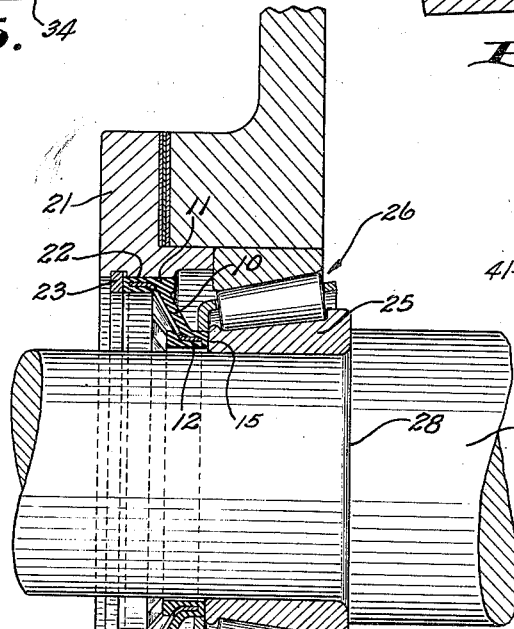
Fig. 4 is a fragmentary sectional view through a stationary bearing housing and rotatable spindle illustrating one type of use for the seals wherein the seal is pressed into the stationary housing, and has its smaller sealing face in rubbing contact with the end face of the rotating inner race of a roller bearing set.

The seal of the present invention is more or less universal in nature and may be applied to a wide variety of uses. A few of these uses are illustrated in Figs. 4, 5 and 6. Referring to Fig. 4, there is a stationary bearing housing 21 having a bore portion 22 into which the seal may be press fitted as illustrated. The face 13 of the seal bears against a retaining ring 23 which is snapped into a groove 24 of the housing. The annular sealing face 15 is positioned to have rubbing contact with an annular end face of the inner race 25 of a roller bearing set 26. The inner race 25 is press fitted onto a rotatable spindle 27 for rotation therewith and has an end bearing against an annular shoulder 28 on the spindle. The retaining ring 23 is so located that the seal is slightly axially deflected toward the exaggerated position of Fig. 3. Thus, the yielding fingers 20 constantly urge the sealing faces 13 and 15 into firm sealing contact with the adjacent machine parts.

In Fig. 5 a seal is shown as having its bore 16 press fitted on the non-rotatable spindle 29, the end face 15 of the seal being in engagement with a retaining ring 30 accommodated in a groove 31 of the spindle. The end face 13 of the larger sealing ring 11 bears against the annular end of an outer race 32 of a roller bearing set 33. This outer race is press fitted into a rotatable machine part 34 for rotation therewith. Thus, there is rubbing contact with the annular end face 13 of the sealing device. In Fig. 6 there is a spindle 34 and a bearing housing 35. The spindle has an annular shoulder 36 against which the end sealing face 15 of the sealing device bears. The end sealing face 13 of the sealing ring 11 bears against the annular end portion of an outer race 37 of a roller bearing set 38. However, in this arrangement the sealing device is so installed that it is free to rotate independently between the shoulder 36 and the restraining end face of the race portion 37. Various other types of installations are possible with the present device.

Figure 1:
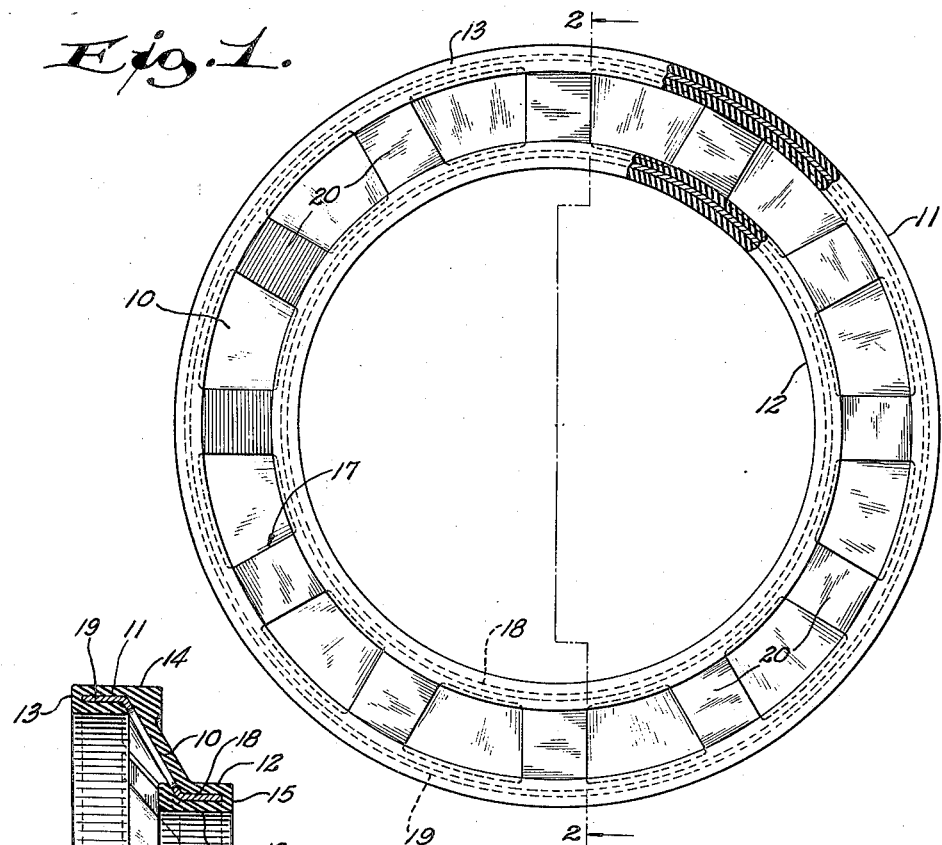
Fig. 1 is an end view of a seal embodying the present invention, parts being broken away and shown in section.
Figure 2:
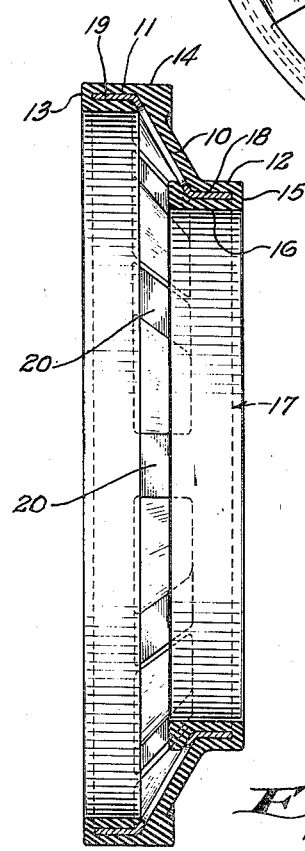
Fig. 2 is a sectional view taken on a line 2—2 of Fig. 1.

In the modification of Fig. 7 the parts are designated by the same numerals primed as the numerals used in the form of the invention of Figs. 1 and 2. In the form of the invention of Fig. 7, however, the sealing ring 12' of smaller diameter extends in the same direction as the sealing ring 11' of larger diameter. In addition, the ring-shaped metal flange 18' extends in the same direction as the metal flange 19'.

One typical installation for this type of construction is illustrated in Fig. 8 wherein the numeral 39 designates a rotatable bearing housing having the rotating outer race 40 of a roller bearing set 41 pressed therein. A seal of the type of Fig. 7 is installed with its larger sealing face 13' in rubbing contact with the end face of the race member 40. The sealing ring portion 12' of smaller diameter is press fitted onto a non-rotatable spindle 42.

In Fig. 9 another type of installation for the form of the invention of Fig. 7 is illustrated. Here, there is a non-rotatable bearing housing 43 having a roller bearing set 44 associated therewith. The roller bearing set 44 has its inner race 45 rotatable with a spindle 46. The improved seal member of the type shown in Fig. 7 is installed with its sealing face 15' of smaller diameter in rubbing contact with the end of the inner race 45. The sealing ring portion 11' of larger diameter is restrained against axial movement by a removable ring 47.

Seals of the type of Fig. 7 have their diaphragm portions 10' normally at an oblique angle, as shown in Fig. 7. When the seal is installed, as in Figs. 8 and 9, the diaphragm is axially compressed against the tension of the reinforcing fingers 20' so that the sealing face is always urged by the resiliency of the yielding fingers 20' into firm sealing contact.

From the above, it is apparent that because of the fact that the sealing rings 11 and 12 and 11' and 12' are reinforced by the metal rings, that there is a radial stiffness which enable them to withstand the action of stones, winding grass or other material which might tend to deform the sealing rings out of a true circular condition and effect the efficiency of the seal. It is also apparent that the portions 11 and 12 and 11' and 12' have the benefit of the stiffening effect of the ring portions 18 and 19 and 18' and 19' thereby having sufficient radial stiffness so that they can be directly press fitted into position. Thus, outer metal containers either for the purpose of maintaining the seal in position or for protecting purposes, may be entirely eliminated.

It is also apparent that the spring metal fingers 20 or 20' which back up the diaphragm portion 10 or 10' allow for a relative axial movement between the sealing ring portions 11 and 12 or 11' and 12'. This movement compensates for any machining inaccuracies and insures proper pressures at the sealing faces 13 and 15.

Various changes and modifications may be made without departing from the spirit of the invention, and all of such changes are contemplated as may come within the scope of the claims.

What I claim is:

1. A sealing device comprising an annular diaphragm of flexible molded material, said diaphragm having an annular flange of the same material forming a first sealing ring projecting therefrom and having another annular flange of the same material and of less diameter than said first flange forming a second sealing ring and also projecting therefrom, and an annular reinforcing member having relatively rigid, continuous ring shaped flanges molded in said sealing rings to stiffen and reinforce the latter against radial deflection and having an axially resilient portion connecting said ring shaped flanges, said sealing rings having end edges forming sealing faces.

2. A sealing device comprising an annular diaphragm of flexible molded material, said diaphragm having an annular flange of the same material forming a first sealing ring projecting in one direction from one side thereof and having another annular flange of the same material and of less diameter than said first flange forming a second sealing ring and projecting in the opposite direction from the other edge of said diaphragm, and an annular reinforcing member having relatively rigid, continuous ring shaped flanges molded in said sealing rings to stiffen and reinforce the latter against radial deflection and having an axially resilient portion connecting said ring shaped flanges, said sealing rings having end edges forming sealing faces.

3. A sealing device comprising an annular diaphragm of flexible molded material, said diaphragm having an annular flange of the same material forming a first sealing ring projecting therefrom and having another annular flange of the same material and of less diameter than said first flange forming a second sealing ring and also projecting therefrom, and an annular reinforcing member having relatively rigid, continuous ring shaped flanges molded within said sealing rings to stiffen and reinforce the latter against radial deflection and having an axially resilient portion connecting said ring shaped flanges and in contact with said diaphragm, said sealing ring having end edges forming sealing faces.

4. A sealing device comprising an annular diaphragm of flexible molded material, said diaphragm having an annular flange of the same material forming a first sealing ring and having another annular flange of the same material and of less diameter than said first flange forming a second sealing ring and an annular reinforcing member of spring metal having ring-shaped relatively rigid-continuous flanges molded within said sealing rings and having spaced axially yieldable connecting fingers for reinforcing said diaphragm positioned to yieldingly resist axial movement of said sealing rings toward each other.

5. A sealing device comprising an annular flared, flexible diaphragm, said diaphragm having an annular flange forming a first sealing ring projecting therefrom and having another annular flange forming a second sealing ring and of less diameter than said first flange also projecting therefrom, and an annular reinforcing member of spring metal having ring shaped relatively rigid, continuous flanges molded within said sealing rings and having spaced axially yieldably connecting fingers in contact with said diaphragm and extending at an oblique angle with respect to the axis of the device, said sealing rings having end edges forming sealing faces.

6. A sealing device comprising an annular diaphragm of flexible molded material, said diaphragm having an annular flange of the same material forming a first sealing ring projecting therefrom and having another annular flange of the same material and of less diameter than said first flange forming a second sealing ring and also projecting therefrom, and an annular reinforcing member of spring metal having ring shaped rigid, continuous flanges molded within said sealing rings and having spaced axially yieldable connecting fingers normally extending at an oblique angle with respect to the axis of the device for reinforcing said diaphragm positioned to yieldingly resist axial movement of said sealing rings relative to each other.

7. A circular sealing device comprising an outer sealing ring, an inner sealing ring spaced inwardly from said outer sealing ring, a diaphragm having a thickness substantially less than the width of said sealing rings connecting the sealing rings with each other, an end edge of at least one of said sealing rings forming a sealing surface for contact with a relatively rotatable member, and means incorporated in said diaphragm and sealing rings for imparting radial rigidity to said sealing rings and axial springlike yieldability to said diaphragm, said radial rigidity providing for the press fit of one of said rings on a supporting element and said axial yieldability yieldingly urging said end edge sealing face against a relatively rotatable member.

8. A circular sealing device comprising an outer sealing ring, an inner sealing ring spaced inwardly from said outer sealing ring, a relatively thin diaphragm connecting the sealing rings with each other, an end edge of at least one of said sealing rings forming a sealing surface for contact with a relatively rotatable member, and an annular member having flanges connected to and positioned in reinforcing relationship with respect to said sealing rings to impart radial rigidity thereto and having a spring like yieldable portion adjacent said diaphragm, said radial rigidity providing for the press fit of one of said rings on a supporting element.

9. A sealing device comprising an annular diaphragm of flexible material, said diaphragm having an annular flange forming a first sealing ring projecting therefrom and having another annular flange forming a second sealing ring and of less diameter than said first flange also projecting therefrom, and an annular reinforcing member having relatively rigid, continuous ring shaped flanges connected to and positioned in reinforcing relationship with respect to said sealing rings to stiffen and reinforce the latter against radial deflection and having an axially yieldable portion connecting said ring shaped flanges, said sealing rings having end edges forming sealing faces.

10. A sealing device comprising an annular diaphragm of flexible material, said diaphragm having an annular flange forming a first sealing ring projecting in one direction from one side thereof and having another annular flange forming a second sealing ring and of less diameter than said first flange projecting in the opposite direction from the other side of said diaphragm, and an annular reinforcing member having relatively rigid, continuous ring shaped flanges connected to and positioned in reinforcing relationship with respect to said sealing rings to stiffen and reinforce the latter against radial deflection and having an axially yieldable portion connecting said ring shaped flanges, said sealing rings having end edges forming sealing faces.

11. A sealing device comprising an annular diaphragm of flexible material, said diaphragm having an annular flange forming a first sealing ring projecting in one direction from one side thereof and having another annular flange forming a second sealing ring and of less diameter than said first flange projecting in the opposite direction from the other side of said diaphragm and concentric with said first sealing ring, and an annular reinforcing member having relatively rigid, continuous ring shaped flanges connected to and positioned in reinforcing relationship with respect to said sealing rings to stiffen and reinforce the latter against radial deflection and having an axially yieldable portion connecting said ring shaped flanges, said sealing rings having end edges forming sealing faces.

12. A sealing device comprising an annular diaphragm of flexible material, said diaphragm having an annular flange forming a first sealing ring projecting in one direction from one side thereof and having another annular flange forming a second sealing ring and of less diameter than said first flange projecting in the opposite direction from the other side of said diaphragm, and an annular reinforcing member having relatively rigid, continuous ring shaped flanges connected to and positioned in reinforcing relationship with respect to said sealing rings to stiffen and reinforce the latter against radial deflection and having an axially resilient portion connecting said ring shaped flanges, said flanges having smooth outer end edges in planes at right angles to the peripheral faces of the flanges, said edges forming circular sealing faces.

13. A sealing device comprising an annular diaphragm of flexible material, said diaphragm having an annular flange forming a first sealing ring projecting therefrom and having another annular flange forming a second sealing ring and of less diameter then said first flange also projecting therefrom, and an annular reinforcing member having relatively rigid, continuous ring shaped flanges connected to and positioned in reinforcing relationship with respect to said sealing rings to stiffen and reinforce the latter against radial deflection and said flanges having smooth outer end edges serving as sealing faces which are urged axially by the axially resilient portion of said reinforcing member, said axially resilient portion being normally disposed at an oblique angle to the axis of the device.

14. A sealing device comprising an annular flared flexible diaphragm, said diaphragm having an annular flange forming a first sealing ring projecting in one direction from one edge thereof and having another annular flange forming a second sealing ring projecting in the opposite direction from the other edge thereof, and an annular reinforcing member having relatively rigid, continuous ring shaped flanges connected to and positioned in reinforcing relationship with respect to said sealing rings to stiffen and reinforce the latter against radial deflection and having an axially yieldable portion connecting said ring shaped flanges, said sealing rings having end edges forming sealing faces.

15. A sealing device comprising an annular diaphragm of flexible material, said diaphragm having an annular flange forming a first sealing ring projecting therefrom and having another annular flange forming a second sealing ring also projecting therefrom and of less diameter than said first flange and concentric therewith, and an annular reinforcing member having relatively rigid, continuous ring shaped flanges connected to and positioned in reinforcing relationship with respect to said sealing rings to stiffen and reinforce the latter against radial deflection, and having an axially resilient portion connecting said ring shaped flanges and extending obliquely with respect to the axis of the device, said sealing rings having end edges forming sealing faces.

16. A sealing device comprising an annular outwardly flanged diaphragm of flexible material, said diaphragm having an annular flange forming a first sealing ring projecting therefrom and having another annular flange forming a second sealing ring and of less diameter than said first flange projecting therefrom in the same direction as said first flange, and an annular reinforcing member having relatively rigid, continuous ring shaped flanges connected to and positioned in reinforcing relationship with respect to said sealing rings to stiffen and reinforce the latter against radial deflection and having axially resilient connecting fingers connecting said ring shaped flanges, said sealing rings having end edges forming sealing faces and said reinforcing member being substantially U-shaped in cross section.

GEORGE W. CURTIS.

REFERENCES CITED

The following references are of record in the file of this patent:

UNITED STATES PATENTS

| Number | Name | Date |
| --- | --- | --- |
| 1,969,008 | Hubbard | Aug. 7, 1934 |
| 2,385,420 | Meyer | Sept. 25, 1945 |
| 2,426,174 | Bottomley | Aug. 26, 1947 |

FOREIGN PATENTS

| Number | Country | Date |
| --- | --- | --- |
| 541,336 | Great Britain | of 1941 |
| 544,732 | Great Britain | of 1942 |